United States Patent [19]
Burke

[11] Patent Number: 5,469,295
[45] Date of Patent: Nov. 21, 1995

[54] DUAL POLARIZING REFLECTION FILTER THREE DIMENSIONAL IMAGE CREATION AND DISPLAY SYSTEM

[76] Inventor: Douglas Burke, 2507 Port Whitby, Newport Beach, Calif. 92660

[21] Appl. No.: 182,230

[22] Filed: Jan. 18, 1994

[51] Int. Cl.$^6$ ............ G02B 27/26; G02B 21/32; G02B 21/26
[52] U.S. Cl. ............ 359/478; 352/43; 352/86; 353/10; 353/28; 359/485; 359/490
[58] Field of Search ............ 359/32, 33, 485, 359/490, 491, 492, 464, 465, 478; 352/86, 43; 353/10, 28, 20

[56] References Cited

U.S. PATENT DOCUMENTS

| | | | |
|---|---|---|---|
| 2,776,598 | 1/1957 | Dreyer | 359/490 |
| 2,788,707 | 4/1951 | Land | 359/465 |
| 2,997,390 | 8/1961 | Land | 359/490 |
| 3,248,165 | 4/1966 | Marks et al. | 359/490 |
| 4,025,688 | 5/1977 | Nagy et al. | 359/490 |
| 4,037,919 | 7/1977 | Takeda et al. | 359/32 |
| 4,978,202 | 12/1990 | Yane | 359/465 |
| 5,347,644 | 9/1994 | Sedlmayr | 359/465 |

Primary Examiner—Martin Lerner

[57] ABSTRACT

A system and method of collecting and displaying images of isolated persons or objects in three dimensions; whereby isolated images of persons or objects (106) are collected on film or video by digitally removing the background and replacing it with black or collecting the image against a black background (107); and the isolated image (106) is projected with polarized light on to a partially reflective and transparent sheet polarizing screen (104) of an orthogonal polarization sense to that of the projected light. The screen stops and reflects the image (105), but the screen is partially-transparent to light polarized parallel to its polarization sense making a real three dimensional physical object (103B) behind the screen visible from a position in front of the screen. The isolated image (105) on the screen (104) in the presence of real physical three dimensional objects (103A) and (103B) appears to be three dimensional.

3 Claims, 7 Drawing Sheets

DUAL POLARIZING REFLECTION FILTER THREE DIMENSIONAL IMAGE CREATION AND DISPLAY SYSTEM

FIELD OF THE INVENTION

This invention relates to a method and system of producing and displaying three dimensional images, specifically of a single person or object with lateral freedom of movement.

BACKGROUND OF THE INVENTION AND DISCUSSION OF PRIOR ART

Figure 1:
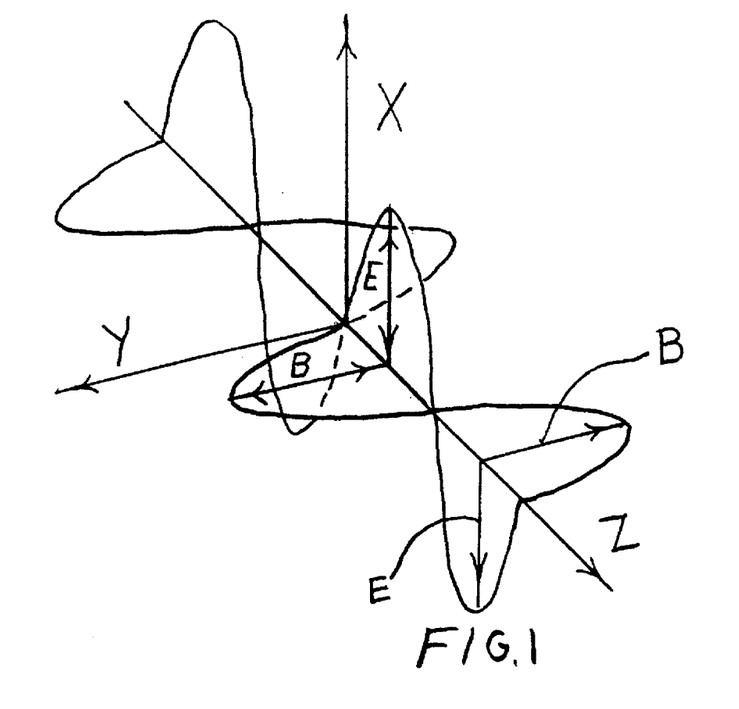
FIG. 1 Travelling electromagnetic wave

Light can be represented as electromagnetic fields which vary sinusoidally and orthogonal to the direction of propagation as shown in FIG. 1. [where the direction of propagation is along the Z-axis.]

For the purposes of this invention it is only the electric field component of the wave which will interact with matter and produce relevant phenomena. An electric field is simply the force per unit electric charge in a region of space. Equivalently, if an electric charge were in a region of space occupied by an electric field it would experience a force equal to the electric field times the magnitude of the charge.

Figure 1A:
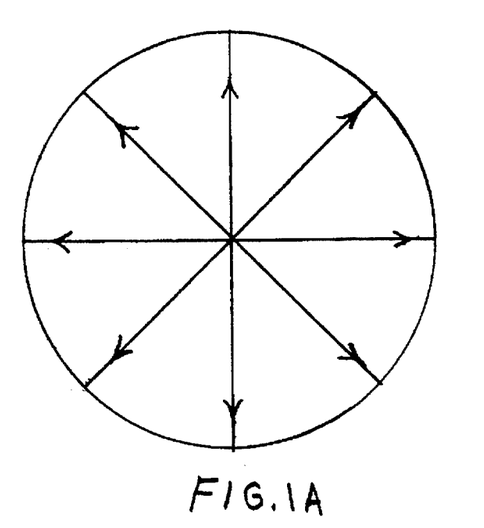
FIG. 1A Some possible polarization states of the electric field in an electromagnetic wave FIG. 2 (Prior Art) A perspective view of a dual screen three dimensional display system, U.S. Pat. No. 3,248, 165 to Marks et al.

Electric fields can be represented mathematically as vector quantities indicating their magnitude and direction at a specific point or in a given region of space. FIG. 1A is the electromagnetic wave in FIG. 1, but with the view looking down the axis of propagation, the Z-axis. FIG. 1-A shows some possible orientations of the electric field. These are only some possibilities. Any orientation in the plane normal to the direction of propagation is possible. That plane is represented as the plane that the circle in FIG. 1A occupies.

As light, an electromagnetic wave, propagates, the behavior of the electric field in space and time is determined by Maxwell's equations, which are a set of equations defined by James Clerk Maxwell which constitute the physical laws of electromagnetism. Maxwell's equations have solutions for travelling waves where the electric field varies along an axis as in FIG. 1, varies in a circular of elliptical manner, or varies randomly.

The orientation of the electric field vector and how it changes with time is known as the state of polarization of the electromagnetic wave or just simply the polarization of the light. If the electric field is confined to a single axis as in FIG. 1 it is said to be linearly polarized. In FIG. 1 it is linearly polarized in the X or vertical direction. Since the electric field at any given moment is confined to a plane parallel to the direction of propagation and a plane is two dimensional, there are only two possible polarization states for light. We can think of them as horizontal and vertical. Although in physics and mathematics the two unique polarization states used are sometimes fight and left circular polarization, these states are simply combinations of vertical and horizontal states that vary in time in the fight way to represent an electric field that rotates in a circular clockwise manner or counterclockwise as the wave propagates. For our purposes we shall speak in terms of vertical and horizontal linearly polarized states knowing that everything we present in this invention is also true if we replace these states with fight and left circularly polarized states.

Some materials act as polarizers. If randomly polarized light enters into a slab of finite thickness of polarizing material with the material's polarization oriented say in the vertical direction, the horizontally polarized portion of the incident light is absorbed and the vertically polarized portion is allowed to pass through the material. The result is that the light emanating out of the polarizing material is polarized in the vertical direction thus polarizing materials polarize light.

The making of sheet polarizers, polarizing material on large sheets of substrates, was pioneered by Edwin H. Land and more by John F. Dreyer. The polarizing layer on these substrates is called a dichroic layer. The phenomena of polarizers and polarizing sheets relate to this invention.

There are also techniques of depositing thin layers of metal, metal oxides, or conducting polymer materials onto substrates. These layers do not polarize light but they act as partial reflectors. They reflect only part of the light that is shined upon them. When you look at one of these layers on a clear substrate you can see objects on the other side and you can also see your reflection. As the thickness of these layers is increased the reflective property increases and the transparent property decreases. The phenomena of partial reflection relates to this invention.

Polarizing layers and conducting layers can be combined as parallel elements onto substrates to produce laminates that can be used for various purposes. Various prior art techniques have been developed to produce such combinations of parallel elements for various purposes. See U.S. Pat. No. 2,776,598 to Dreyer, U.S. Pat. Nos. 2,788,707 and 2,997,390 to Land, U.S. Pat. No. 4,025,688 to Nagy et al., U.S. Pat. No. 5,347,644 to Sedlmayr et al., and U.S. Pat. No. 3,248,165 to Marks et al.

This invention employs polarizing and reflective parallel elements combined on an optical substrate of specific design parameters, governed by the operation of the invention.

An object of the proposed invention is to produce and display a three dimensional image of a single person or object.

Various prior art techniques and apparatus have been heretofore proposed to present three dimensional images on a viewing screen using a stereographic technique such as on a polarization conserving motion picture screen.

See U.S. Pat. No. 4,955,718 to Jachimowicz, et al., U.S. Pat. No. 4,963,959 to Drewio, U.S. Pat. No. 4,962,422 to Ohtomo, et al., U.S. Pat. No. 4,959,641 to Bess, et al., U.S. Pat. No. 4,957,351 to Shioji, U.S. Pat. No. 4,954,890 to Park, U.S. Pat. No. 4,945,408 to Medina, U.S. Pat. No. 4,936,658 to Tanaka, et al., U.S. Pat. No. 4,933,755 to Dahl, U.S. Pat. No. 4,922,336 to Morton, U.S. Pat. No. 4,907,860 to Noble, U.S. Pat. No. 4,877,307 to Kalmanash, U.S. Pat. No. 4,872,750 to Morishita, U.S. Pat. No. a4,853,764 to Sutter; U.S. Pat. No. 4,851,901 to Iwasaki, U.S. Pat. No. 4,834,473 to Keyes, et al., U.S. Pat. No. 4,807,024 to McLaurin, et al., U.S. Pat. No. 4,799,763 to Davis, U.S. Pat. No. 4,772,943 to Nakagawa, U.S. Pat. No. 4,736,246 to Nishikawa, U.S. Pat. No. 4,649,425 to Pund, U.S. Pat. No. 4,641,178 to Street, U.S. Pat. No. 4,541,007 to Nagam, U.S. Pat. No. 4,523,226 to Lipton, et al., U.S. Pat. No. 4,376,950 to Brown, et al., U.S. Pat. No. 4,323,920 to Collendar, U.S. Pat. No. 4,295,153 to Gibson, U.S. Pat. No. 4,151,549 to Pautzc, U.S. Pat. No. 3,697,675 to Beard, et al.

These techniques and apparatus involve the display of polarized or color sequential two-dimensional images which contain corresponding right eye and left eye perspective views of three dimensional objects. These separate images can also be displayed simultaneously in different polarizations or colors. Suitable eyewear, such as glasses having different polarizing or color separations coatings permit the separate images to be seen by one or the other eye. This type of system is expensive and cumbersome because it requires collecting the image from two different views which demands a special camera or two cameras.

U.S. Pat. No. 4,954,890 to Park discloses a representative projector system employing the technique of alternating polarization.

Another technique involves a timed sequence in which images corresponding to right-eye and left-eye perspectives are presented in timed sequence with the use of electronic light valves. U.S. Pat. No. 4,970,486 to Nakagawa, et al., and U.S. Pat. No. 4,877,307 to Kalmanash disclose representative prior art of this type. This time sequence technique also requires the use of eyewear.

There is another example of the timed sequence technique in which the left and right eye views have different polarizations and are viewed not with glasses but with a single polarized screen over both eyes. The screen is formed of a transparent material that has two or more different polarization coatings. U.S. Pat. No. 5,347,644 to Sedlmayr discloses representative prior art of this type.

The timed sequence also requires collecting the image from different views, right eye and left eye.

Alternating polarization and timed sequence stereoscopic techniques both posess the following disadvantages; the image cannot be collected or displayed with convention single view equipment, and eyewear is required for viewing.

It is known that holographic techniques have been used for three dimensional information recording and display. These techniques involve illuminating a three dimensional object with a coherent (laser) beam of light and interfering that light with a reference beam from the same source. The interference pattern is collected on a recording film medium and illumined with the same coherent light from which it was made. The result is a projected image of the object in three dimensions able to be viewed without eyewear. Holographic techniques are not in general use because inherent in them are many limitations: an object has its dimension limited to an extent that it can be illuminated by a laser beam; the object should be stationary; a photograph thereof must be taken in a dark room; and the image cannot be collected and displayed in real time.

Some of the limitations of holography have been addressed by a technique known as composite holography.

Composite holography consists of photographing a three dimensional object in a plurality of different directions under usual illumination such as natural light to prepare a plurality of photographic film sections on which two-dimensional pictorial information is recorded. These two dimensional photographs are information images and are separately illumined with coherent (laser) light and are recorded as holograms. These holograms are then simultaneously illumined with coherent (laser) light producing a projection of the perspective information of the three-dimensional object to be recognized by unaided human eyes at different angles depending upon their position with as much effect as one substantially views the image of the three dimensional object.

Composite holography was limited since the size of the recording medium of the holograms had to be large leading to a large sized overall device making it economically impractical. That limitation was resolved by Takeda et al. as disclosed in U.S. Pat. No. a4,037,919. Also in that disclosure is a detailed description of composite holography.

The disadvantage of composite holography is that it involves photographing the object from many different angles and making a hologram of each of those photographic images. This makes it impossible to collect and display the three dimensional image in real time. A further disadvantage is that it is time consuming, laborious and expensive.

Another example of prior art includes a dual screen system composed of foreground and background screens. The images are collected and projected with incoherent white light. This dual screen system is disclosed in U.S. Pat. No. 3,248,165 to Marks et al.

Figure 2:
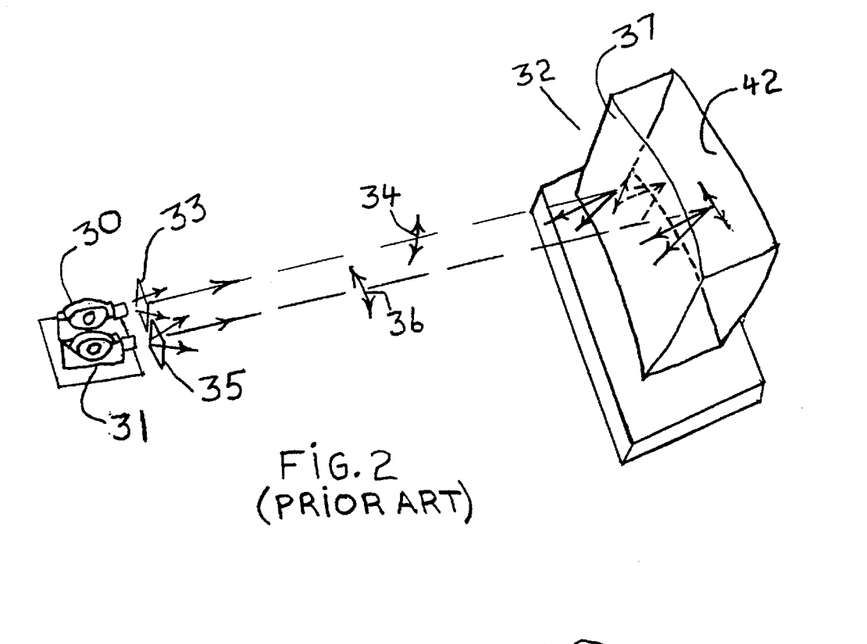

Referring to FIG. 2 Marks' invention includes two projectors 30 and 31 for projecting two beams of light towards a multiple screen 32. A polarizing filter 33 polarizes the light from projector 30, so that the beam is polarized in the vertical direction as shown by arrow 34. Projector 31 directs its beam of light through a polarizing filter 35 so that the beam which is directed toward the screen arrangement is polarized in a horizontal direction as indicated by arrow 36.

Figure 2A:
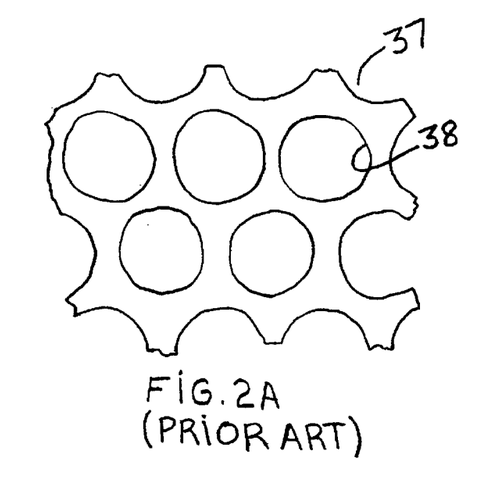
FIG. 2A View of holes in foreground screen from Marks' system
Figure 2B:
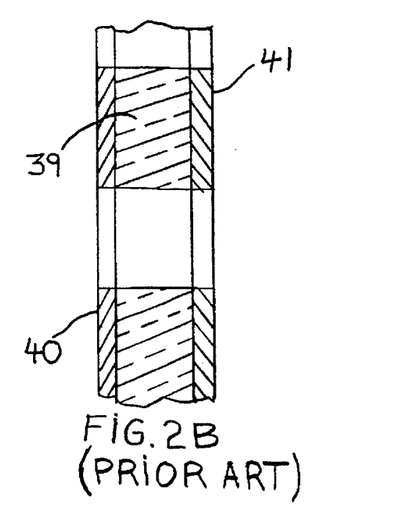
FIG. 2B Cross section of foreground screen from Marks' system
Figure 2C:
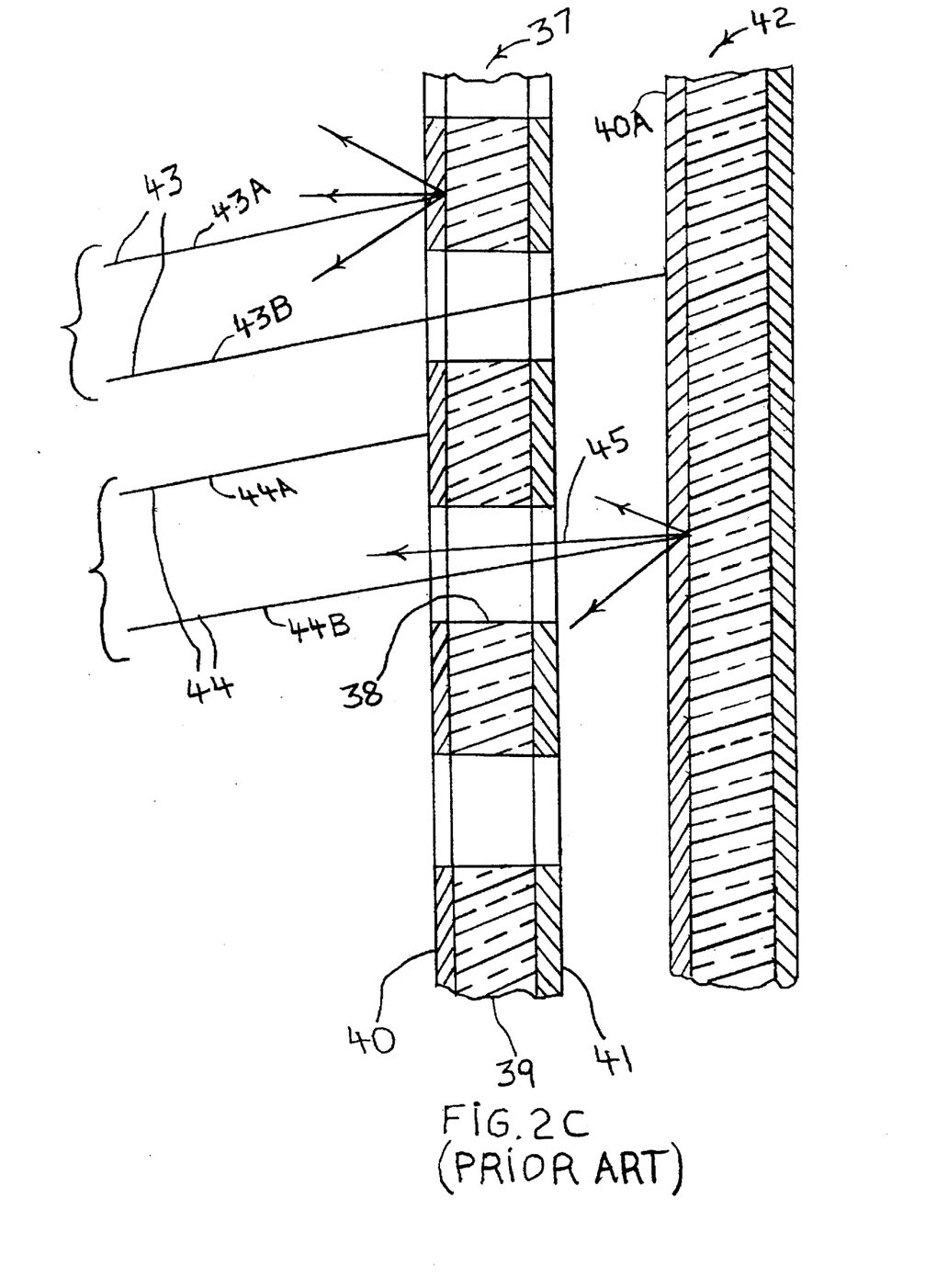
FIG. 2C Schematic diagram illustrating the operation of Marks" system

FIGS. 2A, 2B, and 2C illustrate the manner in which the two screens are formed. The foreground screen 37 is formed with a plurality of holes 38 cut in the screen in a symmetrical array.

Figure 2D:
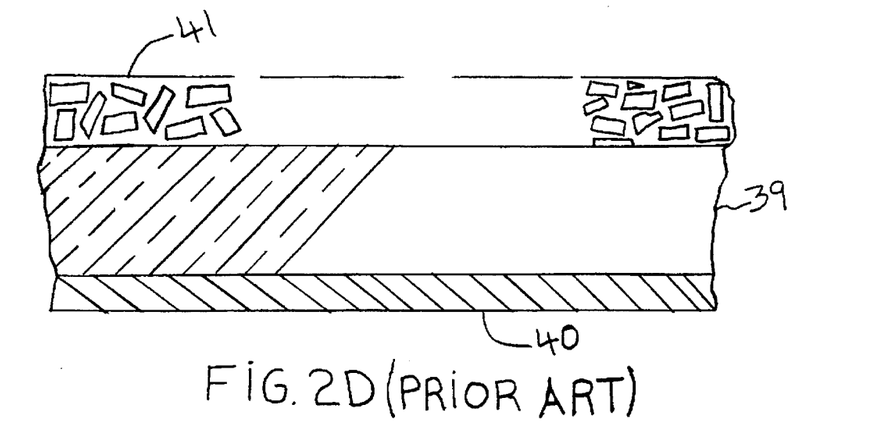
FIG. 2D Close up cross sectional view of the structure of the solid part of the foreground screen and the background screen from Marks' system FIG. 3 Perspective view of the components comprising the proposed three dimensional display system FIG. 4 A frame of film or video containing an isolated image of a subject against an opaque background FIG. 5,6 Perspective view of the layers that constitute the screen in the proposed three dimensional viewing system FIG. 7 Schematic diagram illustrating the operation of the proposed three dimensional display system

In the embodiment of FIG. 2D the solid part of the foreground screen is made up of three layers and includes a supporting sheet 39 which is made of some transparent plastic material. On the side facing the projectors, a thin polarizing film 40 is secured for passing rays of light polarized in the direction passed by the polarizing filter having a parallel plane of polarization and for absorbing the rays polarized at right angles thereto. On the back of the sheet 39 a diffuser-reflector film 41 is secured for reflecting the light rays in a diffused manner without changing their plane of polarization. This diffused reflector film is comprised of small aluminum flakes dispersed in a binder. Behind the diffuser-reflector film is a black coating.

The background screen 42 is composed of the same films and layers as the foreground screen 37 except no holes are cut in this screen and the plane of polarization of the polarizing film 40A is at right angles to the polarizing plane of film 40. In the example shown this plane is horizontal.

FIG. 2D illustrates the method in which the two screens cooperate with the two projectors. The two arrows 43 designate rays of two beams of vertically polarized light, one of which strikes a portion of the foreground screen 37 and also rays of two beams 44 polarized in a horizontal direction, one of said rays being directed through a hole 38 in the foreground screen and incident upon the background screen 42. One of the rays 43A from the projector 30 strikes a portion of the foreground screen and penetrates the polarizing film 40, the plastic film 39, and is diffusely reflected by the reflecting sheet 41. The polarizing film 40 is arranged for passing light which is vertically polarized.

A second ray of light 43B from projector 30 passes through one of the holes 38 and is incident upon a polarizing film 40A on the rear screen 42 which is arranged to pass light which is polarized only in the horizontal direction. For this reason light ray 43B is absorbed in film 40A and cannot be seen by the audience. In a like manner, a ray of light 44A, polarized horizontally, strikes polarizing film 40 and is absorbed while another ray 44B from this same projector passes through hole 38, strikes polarizing film 40A, and is transmitted to the diffusing reflecting sheet 41. The reflected light rays 45 are directed toward the audience but only a portion of them pass through holes 38.

It will be obvious from the above description that one portion of the picture will be projected to the background screen 42, where it will be viewed by the audience while another portion of the picture is projected onto the foreground screen 37 where it also will be seen by the audience.

In general, the background picture will contain objects that are generally parts of a background such as a distant set of objects or a portion of a room or other enclosure which forms the background of a scene. The foreground screen generally will show the actors or other moving objects which are generally desired to be shown in a position which is closer to the audience. The background screen is on a mechanical motor driven track which enables its distance from the foreground screen to be adjusted.

Marks' dual screen system requires two projectors, one for the foreground image and one for the background image. This is a disadvantage because it is desirable to project the image with conventional single projection equipment so that the extra cost involved in equipping a theatre or home entertainment unit is minimal. It will become obvious that the proposed invention produces a three-dimensional image with a single conventional projection unit.

Marks' system requires two screens to produce apparent depth, a foreground and a background screen. The proposed invention produces apparent depth with a single screen.

Marks' system produces an image with an apparent three dimensional quality of an entire landscape that includes actors and foreground objects on the foreground screen and scenery and background objects on the background screen. The foreground screen is partially transparent because it has holes in it. This partial transparency of the foreground screen gives rise to the apparent depth between the foreground and background. The solid part of the foreground screen and the entire background screen are both opaque to the naked eye. The partial transparency of the foreground screen is, again, due to actual physical holes. If the system were displaying a static scene on the background screen and a moving person or object on the foreground screen and a viewer were looking at the image of person or object on the foreground screen from say, ten feet away, the viewer would see holes in the image of the person or object on the foreground screen and the image would not look real. A disadvantage of this system is that it cannot display a performer on a stage in a small theatre or barroom because the audience is too close and the holes in the screen will be seen. This disadvantage also disqualifies this system to be a small home display where a life size three dimensional display of a person could be used for a video phone display, since the viewer would only be several feet from the screen, and again the holes would be visible.

OBJECTS AND ADVANTAGES

Before itemizing the objects and advantages I wish to outline the differences between the proposed invention and the invention proposed by Marks et al. in U.S. Pat. No. 3,248,165.

The proposed system produces an opaque flat image of a person or object on a solid screen that is transparent to the naked eye. In front of and behind the clear screen are real three dimensional physical objects producing apparent depth. The solid image on the clear screen in these circumstances looks three dimentional. Since the screen is solid the image has no holes in it, the image looks real at short distances enabling the proposed invention to function as a video phone display or as a stage presentation of a performer viewed from relatively short distances.

The foreground screen in Marks' invention has holes in it. The solid part of the screen consists of a polarizing layer on top of a metallic flake reflective layer. This solid part of the screen is opaque to both polarization states of light. Light polarized parallel to the polarizer on the screen passes through the polarizer and is reflected by the metallic flake layer. Light polarized orthogonal to the polarizer is absorbed. The solid part of the screen either reflects or absorbs depending on the polarization of the light. It is therefore opaque.

The proposed invention has a single solid screen which consists of a solid layer of transparent conducting material on top of a polarizing material. The conducting material is continuous and solid it is not make of flakes. It is a thin enough layer so that it is partially transparent and partially reflective. This layer's transparent quality is such that objects behind the screen are clearly visible. This quality is not maintained if the layer is composed of metal flakes.

In the proposed invention when light polarized orthogonal to the polarization sense of the polarizer in the screen is projected at the screen it is partially reflected by the conducting layer and what is transmitted through the conducting layer is absorbed by the polarizer and does not transmit through the screen. The screen is therefore completely opaque only to light polarized orthogonal to the screen's polarization sense.

When light polarized parallel to the polarization sense of the screen's polarizer hits the screen part of it is reflected by the conducting layer and the remainder of it is transmitted through the polarizer and through the screen. The screen is therefore partially transparent to light polarized parallel to the polarizer's polarization. Since a viewer sees by way of unpolarized light objects behind the screen will be visible to the viewer.

The screen in the proposed invention is solid, partially transparent due to the electro-optic function of its layers, and has a partially reflective element in front of a polarizer. The foreground screen in Marks' invention has holes in it. It is partially transparent due to the existence of holes, and has a polarizer in front of a totally reflective diffusive layer.

The embodiment of the screen in the proposed invention is different, in structure and function, than the embodiment of either screen in Marks' invention. As mentioned and as will become more obvious the proposed invention constitutes a different method than that proposed by Marks and the proposed method is not obvious upon review of the method proposed by Marks, since if it were, Marks would have used the proposed method and eliminated the need for physical holes since they are an obvious disadvantage in viewing at short distances.

Accordingly several objects and advantages of the present invention are:

(a) To produce a three dimensional image of a single person or object whereby the person or object is collected on film or video from a single view with a conventional camera eliminating the need for dual cameras as employed in stereoscopic or time sequential techniques;

(b) To produce a three dimensional image of a single person or object whereby the image is collected on film or video with a conventional camera and is illuminated with incoherent white light as it is collected unlike holography where the person or object must be illuminated with laser (coherent) light thus making it possible to produce images without the limitations in size that inhibit holography.

(c) To produce a three dimensional image of a single person or object whereby the person or object is collected on video from a single view with a standard video camera and displayed immediately in real time enabling the present invention to be used in a communication or real time broadcast device unlike holography or composite holographic techniques.

(d) To produce a three dimensional image of a single person or object that can be viewed by the naked eye without the use of eyewear as is required by alternating polarization or time-sequential sterographic techniques.

(e) To produce a three dimensional image of a single person or object that can be projected with a single conventional video or film projection unit eliminating the need for two projectors as is required by the alternating polarization stereoscopic techniques or the need for expensive time sequential light value projection systems as required by time sequential stereoscopic techniques.

(f) To produce a three dimensional image of a person or object that is displayed on a single screen eliminating the need for a background screen as required by dual screen systems (g) To produce a three dimensional image of a single person or object on a solid screen with no holes so that the image can be viewed from short distances and still look real.

(h) To produce a three dimensional image of a single person or object of life size or larger or smaller proportions for a cost that does not exceed the cost for recording and displaying a standard video.

(i) To produce a three dimensional image of a person or object where the image is displayed on a single screen that can also display standard video or film projection.

SUMMARY

Single persons or objects are captured as isolated images on film or video and are projected with polarized light on to a clear solid partially reflective and transparent sheet polarizing screen of orthogonal polarization sense to that of the projected light. The screen stops and reflects the projected image because of its intensity and polarization but the screen appears to be transparent to the unpolarized low intensity light by which the viewer sees. In front of and behind the screen are real physical three dimensional objects that are visible to the viewer. The opaque image of the person or object on the transparent screen, in the presence of real physical objects in front of and behind the screen, appears to be three dimensional.

DESCRIPTION OF THE INVENTION

Figure 3:
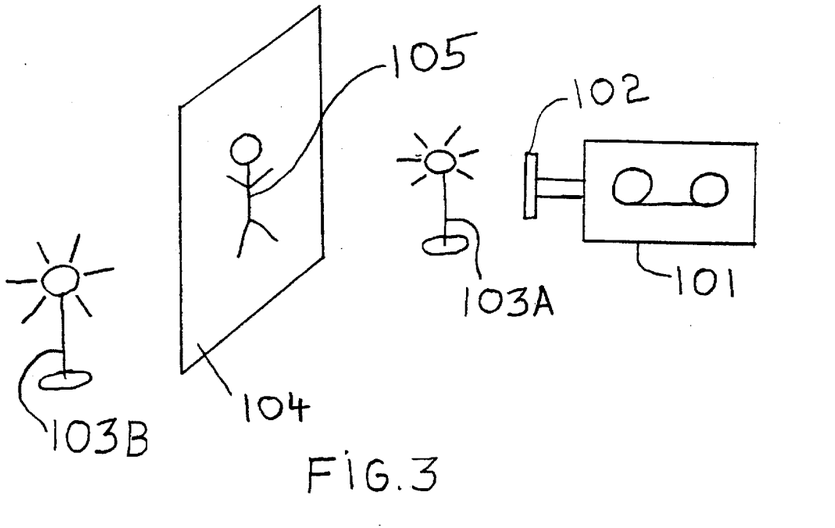

FIG. 3 shows a perspective view of the basic embodiments of the invention which include a video or film projector 101, a polarizing filter 102, a real physical three dimensional object 103A a projected image 105, a partially reflective and transparent sheet polarizing screen 104 of the opposite polarization sense to that of the polarizer 102 and a real physical three dimensional object 103B. A medium in the projector 101 may be video or film.

A person or object of which a three dimensional image is formed shall be referred to as a subject.

Figure 4:
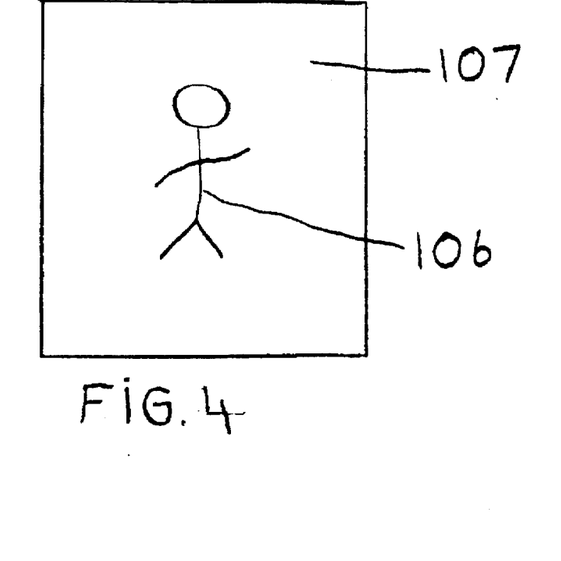

If film is used a subject is filmed against a black background composed of a material that is an optical absorber. This isolates the subject in each frame of film as shown in FIG. 4. In FIG. 4 an image of the subject 106 is captured in the frame and the area that lies outside the boundary of the image 107 is opaque. This insures that the only thing that is projected is the isolated image of the subject 106.

If video is used the subject can be videod against an optical absorber to isolate the image.

Since video footage is digital the subject can be videod against a neutral color background and the image can be isolated in a different manner. This manner for isolating the image is based on the standard video technique of keying. Keying is a process of making various parts of a given image transparent by isolating a certain characteristic (such as luminance or chroma level). There are currently a multitude of video cameras that can do this. These cameras have the feature known in the art as a chroma key. Because of its singular color, the background, if properly lit, can be replaced (for the purpose of this technique with black). The lighting of the background must be flat and the material must be made of a neutral color (such as blue) that is even in light level.

This digital technique of isolating the image in each frame of video insures the image, of the subject 106 is projected onto the screen and the background image 107 is not projected. For most applications the projection intensity required is 4–8 milliwatts per centimeter squared however the invention is not limited to this window of intensity.

The polarizing filter 102 is a polarizing material on a substrate coveting the projection lens so that the light that is projected is polarized. The thickness of the polarizing layer must be large enough so that for a given projection intensity the light emanating from the projector is polarized.

Figure 5:
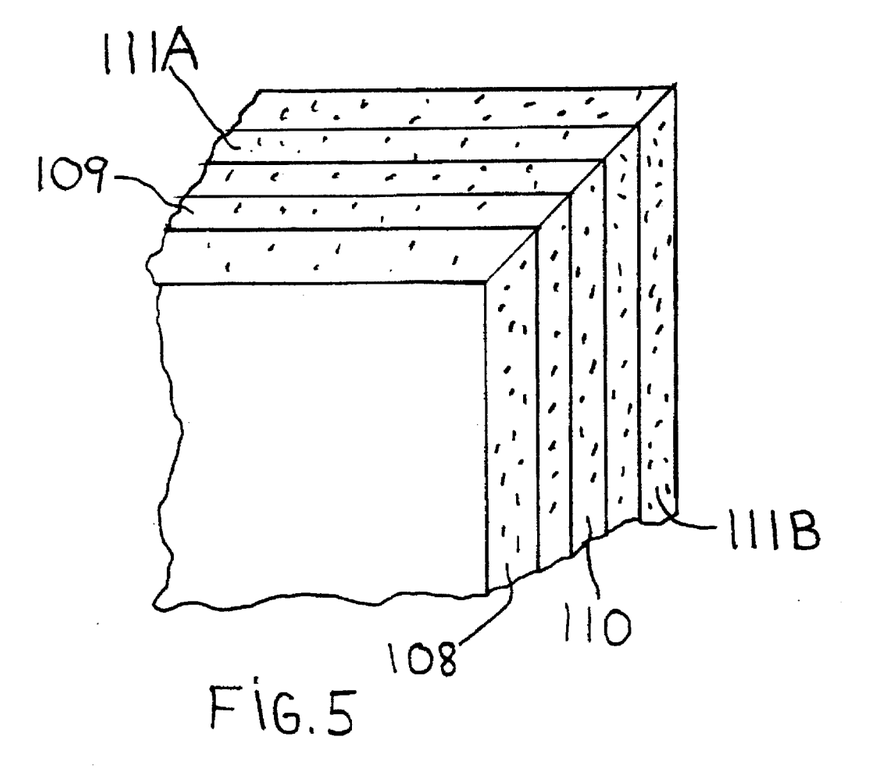

The screen 104 consists of several layers and a perspective view of the cross section of a first design for the screen is shown in FIG. 5.

The screen consists of a transparent substrate 108, a polarizing layer 109, a binding layer 110, another transparent substrate 111A, and a partially reflective and transparent layer 111B.

Figure 6:
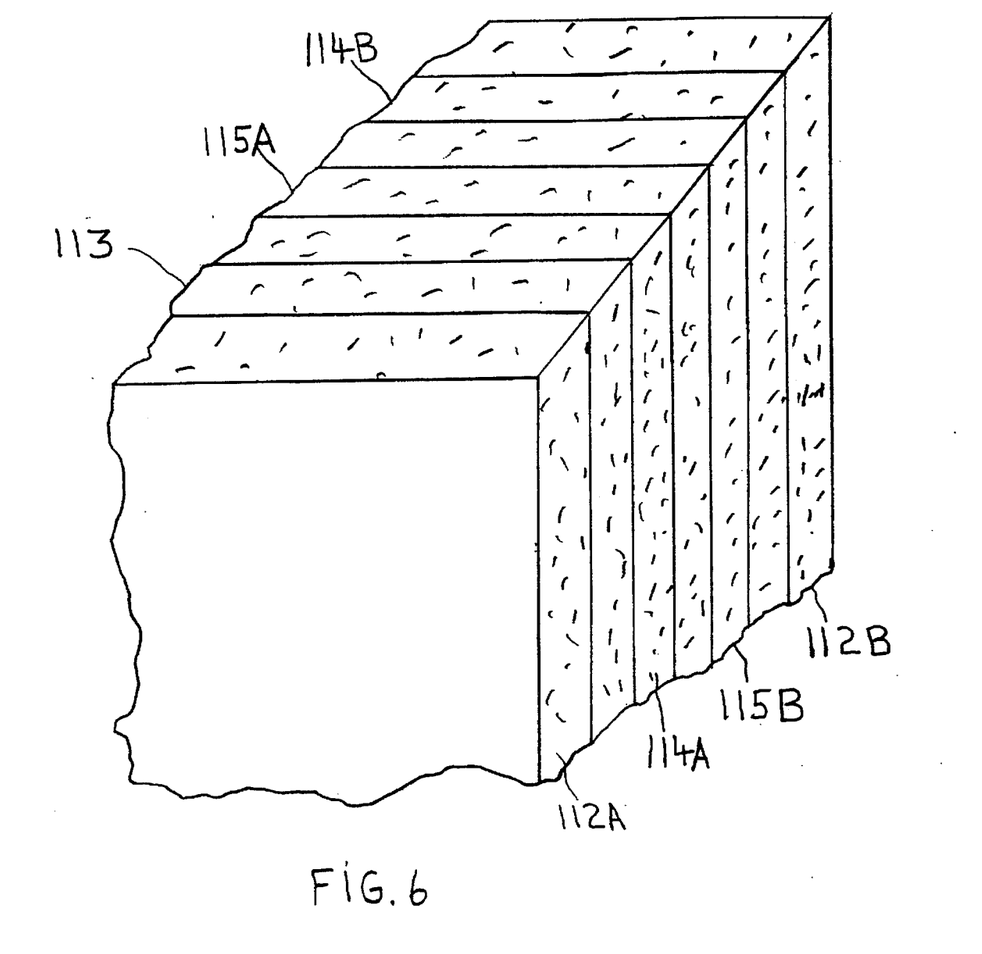

A perspective view of the cross section of a second design for the screen is shown in FIG. 6. The screen consists of a transparent substrate 112A, a polarizing layer 113, a transparent binding layer 114A, a transparent substrate 115A, a partially reflective and transparent layer 115B, a transparent binding layer 114B, and a transparent substrate 112B. In both screens proposed the partially reflective and transparent layer is closest to the projector and the polarizing layer is behind the partially reflective and transparent layer and is thus farther from the projector.

In both screens the transparent substrates must be made of materials that do not change the state of polarization of light when it passes through them.

The transparent substrates 108, 111A, 112A, 112B, and 115A, are clear glass or plastic. 108, 111A, and 112B are thick enough so that the screen has mechanical stability for a given size of viewing area. 111A and 115A are only thick enough so the partially reflective and transparent layer can be bound to the polarizing layer.

The polarizing layers 109 and 113 are of an orthogonal polarization sense to that of the projected light and are formed and bound to the substrate in a sheet. Methods of making sheet polarizers on substrates are disclosed in U.S. Pat. Nos. 2,524,286; 2,544,659; and 2,553,961. To Dreyer and in U.S. Pat. Nos. 1,956,867; 2,011,553; 2,158,129; and 2,237,567 to Land. A clear dichroic sheet polarizer can be used as described in U.S. Pat. No. 2,544,659 to Dreyer. The thickness of the polarizing material in the polarizing layer is 50–150 microns or simply thick enough so that all of the projected light that gets through the transparent conducting layer and moves into the polarizer is absorbed and does not pass through the screen. The reason for this will be made obvious in the discussion about the operation of the invention. The paartially reflective and transparent layers 111B and 115B can be thin layers of transparent conductors on a thin substrate 111A, 115A. This substrate needs to be thick enough to support the transparent conductor and be bound to the polarizer. The substrate can be but is not limited to glass or plastic and should be around 10 mils thick. The substrate can be any other transparent material that does not change the polarization of light and is able to sustain a deposition of a thin layer of conductor.

The thin layer of conductor is 1–10 microns. For most materials this window of thickness allows for partial reflection and partial transmission through the layer.

The conducting materials that can be used but to which the invention is not limited, are: Indium-tin-oxide, Indium-oxide, tin-oxide, silver, silver-oxide, zinc, zinc-oxide, deposited by evaporation sputtering or magnetron sputtering; titanium, cadmium, and lead oxide compounds deposited by thermal decompression; Oxide compounds using Cd, Ca, Mg, Ba, Sr, B, Nz, Ni, Fe, Cu as carrier deposited by chemical decomposition; transparent conducting polymers such as poly (alkoxythienylene vinylene), polyisothianaphthene, polyphenylquinaline, poly (p-phenylene), or polyacetylene which can be coated by reaction with pyrroles, thiophenes, azulene, oxirancs, anilines, or furans and prepared by electrochemical polymerization, solution cast, chemical vapor deposition, or direct chemical polymerization onto a substrate.

Conducting materials are used for the partially reflective and transparent layer because they do not change the state of polarization. The polarization of the projected light must remain unaltered after part of it passes through the partially reflective and transparent layer and moves into the polarizing layer so that it can be absorbed by the polarizer. The reason for this will be made apparent in the discussion about the operation of the invention.

Non-conducting materials may be used for the partially reflective layer if a thin deposition on a substrate of such materials allows for partial transmission and partial reflection and does not change the state of polarization upon transmission.

The materials for the partially reflective layer are available and the techniques for depositing them on a substrate are readily accomplished at Optical Coatings Laboratory Inc., Santa Rosa, Calif.

The binding layers 110, 114A, 114B are transparent and some materials that can be used are clear polyvinyl acetals, polyvinyl, butyral films, cellulose acetate, acryloid A-10, acroloid B72 or Canada balsam. Solvents used with these binders must not dissolve the polarizer.

Other binders that are clear and transparent and do not dissolve the polarizer may be used. The optical requirements are that objects observed behind the screen by viewers in front of the screen, are clearly seen as if looking through a clean clear glass window. The mechanical requirement is that the binder hold the screen together.

The reference objects 103A, 103B are real physical three dimensional objects placed in front of and behind the screen.

All of the materials in the screen are not limited to the ones mentioned. The materials must function optically and mechanically as mentioned.

OPERATION OF THE INVENTION

Referring to FIGS. 3 and 4; the projector projects incoherent white light through the frames of video or film and projects only the isolated image in the frame 106 and does not project the surrounding background in the frame 107 because it is opaque.

The projected light that is carrying the image passes through the polarizer 102 and becomes polarized. The polarized projected image moves through the air until it hits the partially reflective and transparent sheet polarizing screen 104 where it is stopped, reflected and seen on the screen as a solid image.

Figure 7:
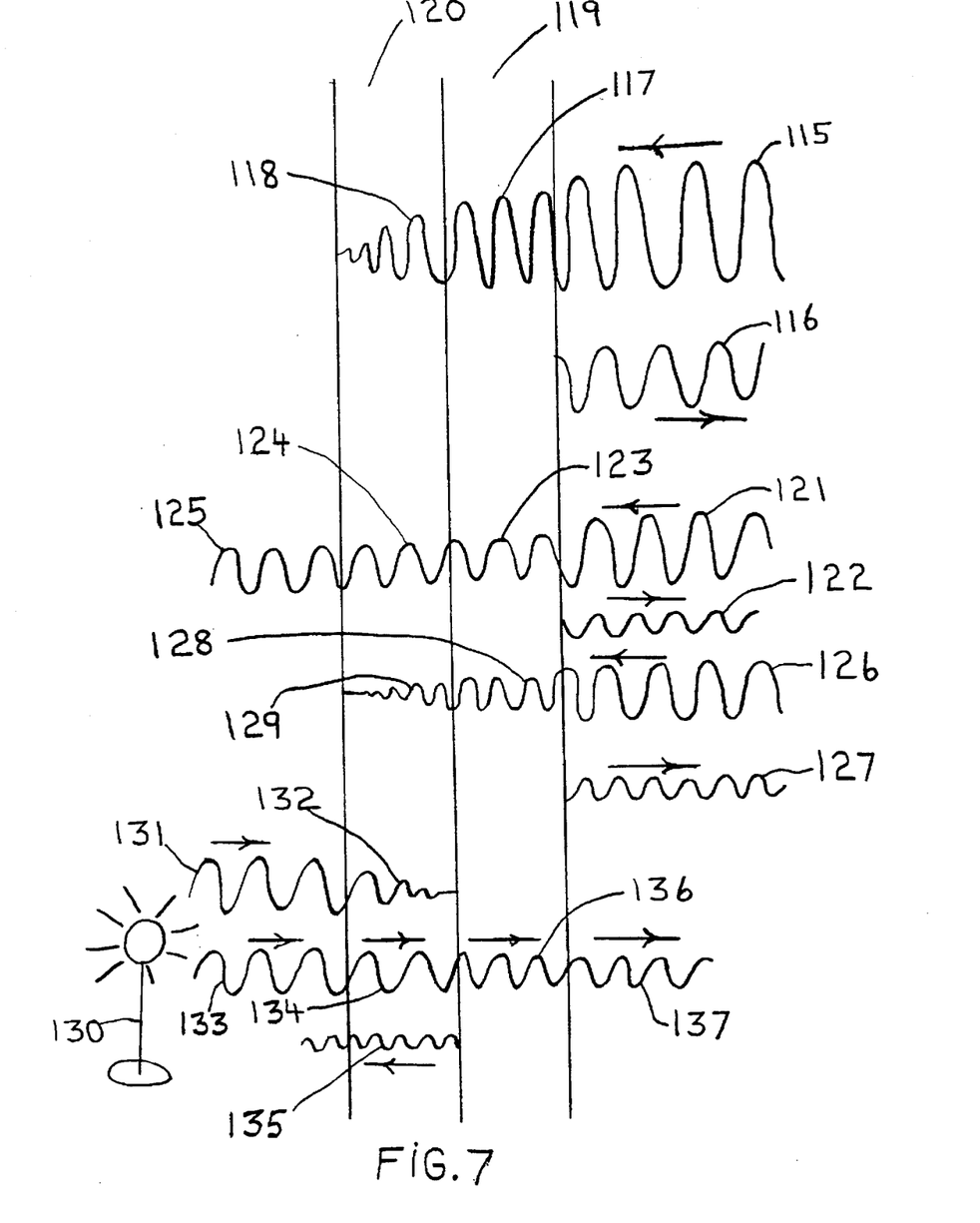

Referring now to FIG. 7, the polarized light carrying the image is represented diagrammatically as a wave 115. The partially reflective and transparent sheet polarizing screen, though it is many layers, is represented schematically in FIG. 7 as two layers, a partially reflective and transparent layer 119, and a polarizing layer 120.

When the polarized projected wave 115 hits the partially reflective and transparent layer 119; part of it is a reflected wave 116 and is seen by the audience as the image of the subject on the screen; part of it is a transmitted wave 117 and moves through the partially reflective and transparent layer 119. The transmitted wave 117 moves into the polarizer 120 and becomes an absorbed wave 118 as the polarizer absorbs and diminishes its amplitude to zero. The polarizing material must be thick enough so that the wave 118 decays to zero while it is in the polarizer 120. This insures that none of the projected light passes through the screen since that which is not reflected is absorbed.

The wave that is transmitted 117 through the partially reflective and transparent layer 119 must not have its polarization changed as it passes through the material 119 since the reason it is absorbed by the polarizer 120 is because it has a polarization sense orthogonal to the polarizing material. Equivalently if the projected wave has a vertical polarization the sheet polarizer has a horizontal polarization sense and vice versa.

The viewer sees by way of unpolarized light since there is no eyewear required and his or her perception is accomplished with the naked eye. Since unpolarized light is an equal amount of vertically and horizontally polarized light we can examine the path of sight of the view by examining the interaction of each polarized state of light with the screen.

The light by which the viewer sees that is polarized orthogonal to the polarization sense of the polarizer 120 in the screen can be represented diagrammatically by the wave 126 in FIG. 7. The wave 126 hits the screen's partially reflective and transparent layer 119 and part of it is a reflected wave 127 which is small in amplitude compared to the reflected wave 116 and is relatively unseen. Part of the wave 126 becomes a transmitted wave 128 and passes through the partially reflective amd transparent layer 119 and moves into the polarizing layer 120 and becomes an absorbed wave 129 and decays to zero in the polarizer.

The light by which the viewer sees that is polarized parallel to the polarization sense of the polarizer 120 in the screen can be represented diagrammatically by the wave 121 in FIG. 7. The wave 121 hits the screen's partially reflective and transparent layer 119 and part of it is a reflected wave 122 which is small in amplitude compared to the reflected wave 116 and is relatively unseen. Part of the wave 121 becomes a transmitted wave 123 and passes through partially reflective and transparent layer 119 and into the polarizing layer 120 where the transmitted wave is referred to as 124. The wave 124 is polarized parallel to the polarization sense of the polarizer 120 in the screen and therefore the wave 124 passes through the polarizer and emerges as wave 125 on the other side of the screen. The wave 121 which becomes waves 123, 124, and 125 and thus passes through the screen is the means by which the viewer sees through the screen and represents the transparent quality of the screen. The viewer can see through the screen even though the screen is solid and has no holes in it. The path of light that goes through the screen is reversible meaning light polarized parallel to the polarizer in the screen can start from behind the screen and travel through the screen and be seen by the viewer positioned in the area in front of the screen. Equivalently light can travel through the screen in either direction. This is true because the equations for light, Maxwell's equations, are symmetric with respect to the spatial direction and the optical properties of materials out of which the screen is made are symmetric with respect to space. This means if you can see through the screen in one direction you can see through it equally as well in the other direction. Equivalently, showing that light of the right polarization can travel through the screen from right to left in FIG. 7 is proof that an object behind the screen can be seen by a person in front of the screen. This will become clear again when we track the light from the reference object 130 through the screen to the eye of the viewer.

Since the reflected wave 116 is much higher in amplitude than the transmitted wave 125 the image of the object or person on the screen which is represented by the wave 116, does not appear to be transparent to the viewer but looks solid.

The reference object 103B in FIG. 3 is represented as 130 in FIG. 7. The reference object is a lamp or lamppost and is a source of light. The reference object does not have to be a source of light directly and the invention is not limited to reference objects which are light sources. However any object used as a reference object can be thought of as a light source since the light emanating from it is the means by which it is seen even if that light is reflected off the object from an independent source. For instance if the reference object is a chair and a light is pointed at the chair from above that light reflects off the chair and enables the chair to be scene.

For simplicity, then, we represent the reference object as a light source 130. The light emanating from 130 is unpolarized and is composed of equal amounts of light that is polarized parallel and orthogonal to the polarization sense of the screen.

The light emanating from the reference object that is polarized orthogonal to the polarization sense of the screen is represented by the wave 131 in FIG. 7. Wave 131 propagates toward the screen until it hits it and moves into the polarizing layer 120 and becomes an absorbed wave 132 and decays to zero.

The light emanating from the reference object that is polarized parallel to the polarization sense of the screen is represented by the wave 133. Wave 133 hits the screen and moves into the polarizer and becomes a transmitted wave 134. The transmitted wave 134 moves through the polarizer and hits the partially reflective and transparent layer where part of it becomes a reflective wave 135 and part of it becomes a transmitted wave 136.

The reflected wave 135 moves back into the area behind the screen where it can be absorbed either by an optical absorber or it can travel into abeyance if there is enough space behind the screen.

The transmitted wave 136 moves through the partially reflective layer 119 and on out into the area in front of the screen and is referred to as wave 137 in FIG. 7.

Wave 137 carries with it the image of the reference object and is seen by the viewer. Thus again we see that objects behind the screen are visible to the viewer.

A partially reflective material of thickness 1–10 microns, a polarizing material of 50–150 mils, and a projection intensity of 4–8 milliwatts/cm$^2$ produces a full clear solid image on the screen. These dimensions encompass the range where most of the mentioned materials perform however the invention is not limited to these dimensions and materials.

Referring to FIGS. 5, 6, and 7 more general requirements for the operation of the invention can be defined as follows: If a material is chosen for the partially reflective and transparent layer, 111B or 115B, the thickness of that material much be chosen so that when you look through it you can clearly see the reference objects behind the screen when they are well lit.

The intensity of the projected light must be high enough so that the reflected wave 116, which is the image of the person or object, has an amplitude larger than the reflections from peripheral or background light in front of the screen represented by 122 and 127.

The thickness of the polarizing material 109 and 113 must be adequate to ensure that the part of the projected wave 117 that moves into the partially reflective and transparent layer and becomes an absorbed wave 118 in the polarizer decays to zero within the polarizing layer and does not pass through the screen.

Referring now to FIG. 3 the projected image is stopped by and reflected off of the screen and is seen as a solid isolated FIG. 105 on a partially reflective and transparent screen 104 with no holes in it.

In front of and behind the screen are real physical three dimensional objects 103A and 103B, which are visible by a viewer in front of the screen.

The isolated image of the subject 105 on the partially reflective and transparent screen 104, in the presence of reference objects 103A and 103B, appears to be three dimensional when viewed by a viewer positioned at any point in front of the screen.

CONCLUSIONS RAMIFICATIONS AND SCOPE

Thus the reader will see that the method of creating and displaying a three dimensional image of a single person or object: is simple, cost effective, can be done using conventional cameras and projection equipment, can be accomplished in real time for communication applications, and can be used to create life-size three dimensional virtual reality of a person.

The image is displayed on a screen that is solid with no holes and can be viewed at short distances. A single screen can be used as: a conventional television or movie screen; a three dimensional display of a person or object for entertainment, communication or advertisement; and a computer display thus unifying the home theater-entertainment-communication multimedia unit.

While the above description contains many specifities, these should not be construed as limitations on the scope of the invention but rather as only several preferred embodiments thereof. Accordingly, the scope of the invention should be determined not by the embodiments shown but by the appended claims and their legal equivalents.

I claim:

1. A method of collecting an image of a subject and a system of displaying said image in apparent three dimensions comprising:

(a) a means of collecting said image of said subject on a visual recording medium that isolates said subject on the medium so that only the isolated image of said subject is projected when light is projected through said medium and (b) a means of projecting said image with polarized light, and (c) a screen on which said image is projected being continuous and solid and composed of parallel plane layers consisting of a first transparent substrate on which is bound a polarizing layer with polarization oriented orthogonal to the polarization of said polarized light used to project said image, a transparent binding layer, and a second transparent substrate on which is deposited a partially reflective and transparent layer, and (d) a real physical three dimensional physical object placed in front of and behind said screen, and (e) said second transparent substrate on which said partially reflective and transparent layer is deposited being thin but thick enough so that it can be bound to said polarizing layer by means of said binding layer, and (f) said second transparent substrate on which said partially reflective and transparent layer is deposited, said partially reflective and transparent layer and said transparent binding layer being composed of materials that do not change the polarization of light when light passes through them, and (g) said binding layer being composed of material that does not ruin the polarizer, and (h) said partially reflective and transparent layer being positioned in front of said polarizing layer so that said image when projected hits said partially reflective and transparent layer before it hits said polarizing layer, and (i) said partially reflective and transparent layer being thin enough so that objects behind said screen can be seen from a position in front of said screen and thick enough to reflect enough of the said polarized light used to project said image so that said image can be seen on said screen, and (j) said means of projecting said image with said polarized light being accomplished with light of intensity high enough so that said image can be seen on said screen.

(k) said polarizing layer being thick enough to absorb all of said polarized light used to project said image that passes through said partially reflective and transparent layer and into said polarizing layer.

2. A system a described in claim 1 wherein said screen further includes an additional binding layer and transparent substrate on top of said partially reflective and transparent layer.

3. A system as described in claim 1 wherein said polarizing layer in said screen is made of a material selected from the group consisting of polarizers of thickness between 50 and 150 microns, said partially reflective layer in said screen is made of a material selected from the group consisting of transparent conductors of thickness between 1 and ten microns, and said means of projecting said image with polarized light being accomplished with light of intensity between 4 and 8 milliwatts per centimeter squared.

* * * * *